UNITED STATES PATENT OFFICE.

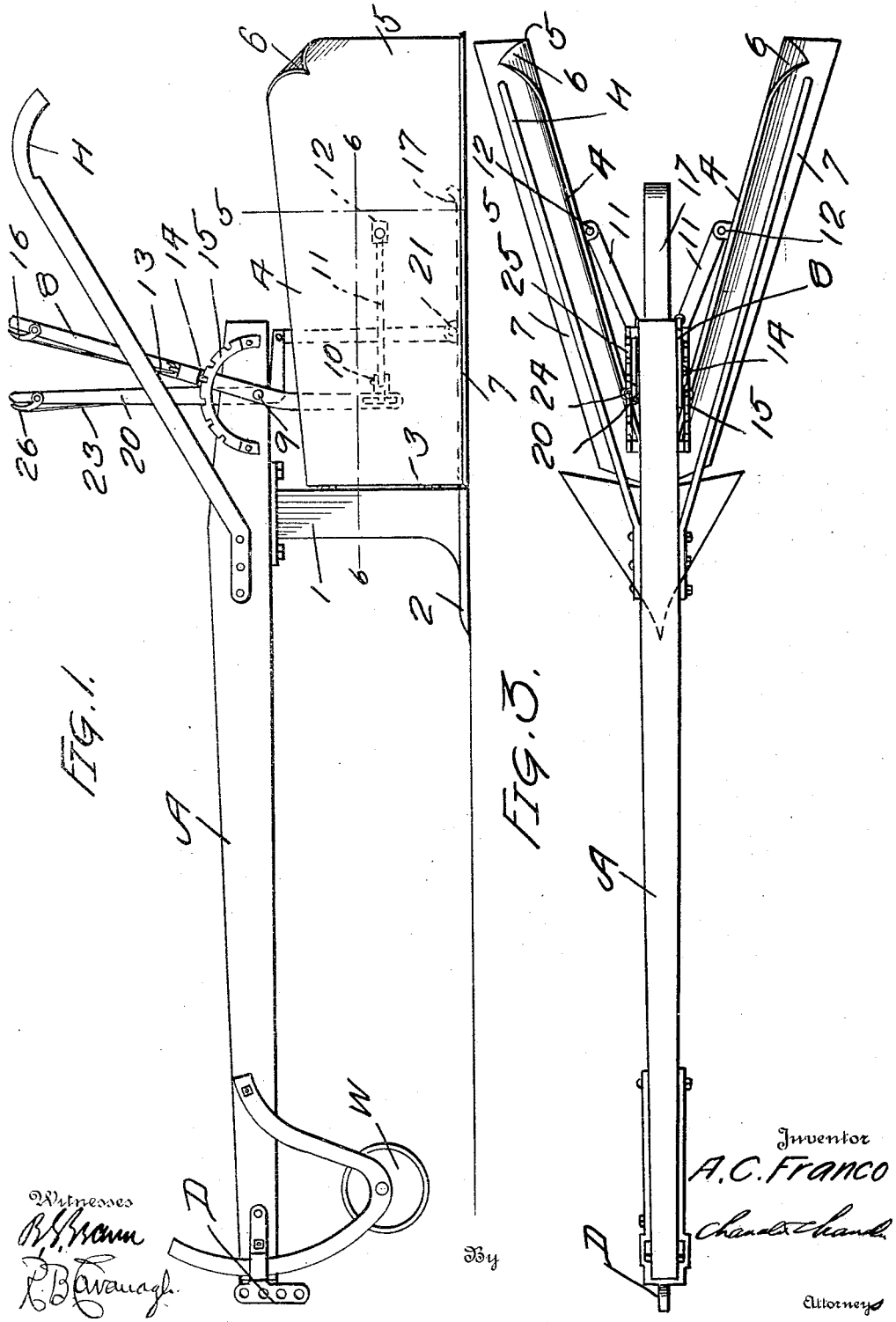

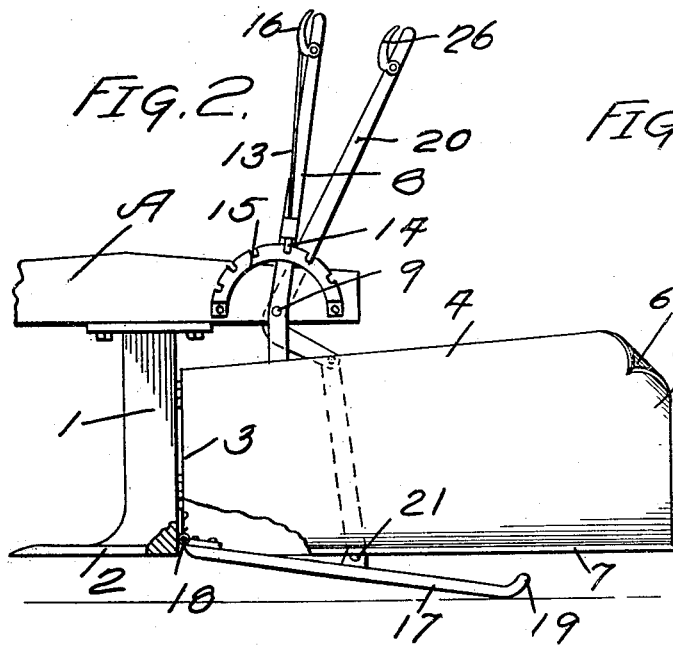
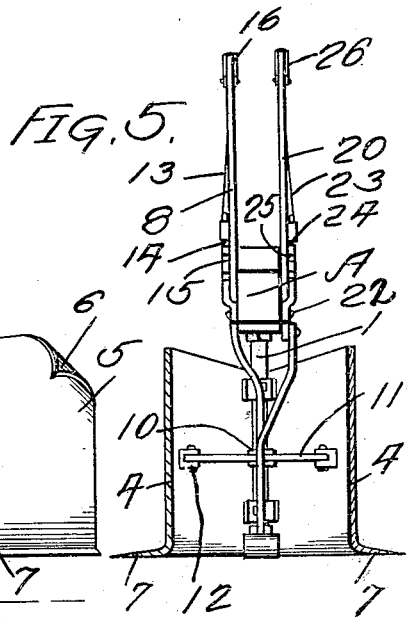
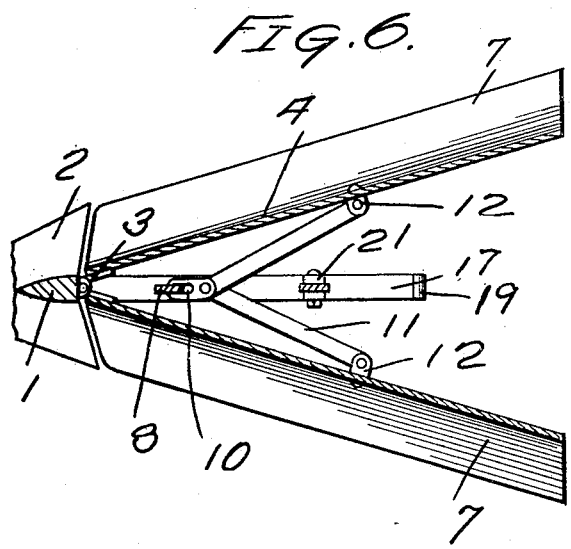
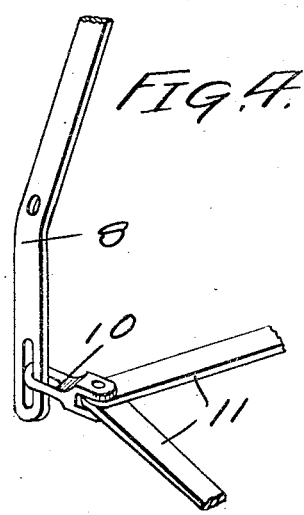

ALFRED C. FRANCO, OF PAIA, TERRITORY OF HAWAII.

SHOVEL-PLOW.

1,198,832.              Specification of Letters Patent.       Patented Sept. 19, 1916.

Application filed February 8, 1915. Serial No. 6,784.

*To all whom it may concern:*

Be it known that I, ALFRED C. FRANCO, a citizen of the United States, residing at Paia, in the county of Maui, Territory of Hawaii, have invented certain new and useful Improvements in Shovel-Plows; and I do hereby declare the following to be a full, clear, and exact description of the invention, such as will enable others skilled in the art to which it appertains to make and use the same.

This invention relates to certain novel and useful improvements in a shovel plow adapted especially for use in the cultivation of sugar cane, although it is, of course, to be understood that it is not limited in its application to this particular purpose.

In certain regions where sugar cane is grown on a very large scale, for instance in the Hawaiian Islands, a great deal of time and money is required for proper cultivation, or in order to obtain the best results. It is the practice in these islands to plant the cane in furrows in order that it may be properly irrigated, and after the first crop has been cut, the furrows are first plowed with a small plow to break up the land, then a second plow is employed to reopen the furrow, and subsequently a third plow or hiller is used to throw the dirt toward the cane. Even after the work has been done with the hiller, field hands are employed who use hoes to pull the dirt to the roots of the cane. The consequence is that the proper cultivation of a crop is a long, tedious and expensive proceeding.

In the present instance it is my purpose to provide a novel form of plow which is intended to be used after the small plow, above mentioned, has been employed to break up the furrows. My plow partakes somewhat of the nature of a hiller plow and is to be used for the purpose of pushing the soil to the roots of the cane, and as some furrows are wider than others, I make provision for widening and narrowing, or opening and closing the wings of the plow, hereinafter described, to accommodate the particular furrow on which the plow is working. Furthermore, in order that the plow will not cut the water courses or small irrigation channels or ditches of the field, I make provision for raising the plow when such a water course is reached, and lowering the plow after the water course has been passed.

Still a further object of my invention is the provision of a plow of this character which will embody the desired features of simplicity, efficiency and convenience, and which may be manufactured and marketed at a relatively low cost.

With the above recited objects and others of a similar nature in view, my invention consists in the construction, combination and arrangement of parts set forth in and falling within the scope of the appended claims.

In the accompanying drawings: Figure 1 is a view in side elevation of a plow embodying my invention and showing the same in its lowered, normal working position. Fig. 2 is a similar view showing the plow elevated to position to pass a water course. Fig. 3 is a top plan view of the plow shown in Fig. 1. Fig. 4 is a detail perspective of the lever and links for adjusting the wings relative to each other. Fig. 5 is a vertical sectional view taken on the line 5—5 of Fig. 1. Fig. 6 is a sectional view taken on the line 6—6 of Fig. 1.

Referring now to the accompanying drawings in detail, the letter A indicates the plow beam, provided at the forward end with the usual draft appliances D and the gage wheel W. Secured to and depending from the beam A, adjacent the rear end thereof, is the plow standard 1, carrying at its foot a substantially triangular plow point 2, the beveled sides of which assist in hilling the dirt from the furrow. Hinged at their forward ends 3 to the rear of the standard are the two rearwardly extending wings 4. Each of these wings is in the nature of a vertically disposed metallic plate, each plate being relatively higher at its rear end 5 than at the forward end 3. The upper rear corner of each plate is curled or bent outward as at 6, these curled or bent ends being for the purpose of throwing the dirt toward or to the roots of the sugar cane. The bottom longitudinal edge of each plate is bent to form an outwardly extending flange 7 which rides in contact with the furrow.

As above stated, each of the wings 4—4 is hinged as at 3 to the vertical standard 1, and these wings diverge relatively to each other from their point of conjunction with the standard toward their rear ends. In order to adjust these two wings toward and from each other, I provide a vertically disposed lever 8, which is pivoted as at 9 to the beam A, the lower end of this lever being pivotally connected as at 10 to the toggle 11, the outer ends of the links of which are connected as at 12 to the wings 4. The lever is further provided with the usual locking rod 13 carrying a pawl 14 which works over a notched quadrant 15 fastened to the beam A, this locking rod being operated by the usual handle 16. From this construction it will be seen that when the pawl 14 is released by pressing on the handle 16, the lever 8 may be shifted forward and rearward of the beam to move the wings 4 toward and from each other. The pawl 14, may of course, be selectively engaged with a notch in its quadrant 15 to hold the plates in any desired position of adjustment relative to each other.

In order to raise the plow when passing over a small water course or irrigation channel or ditch, I provide a relatively flat bar 17 which is in the nature of a shoe and is hinged as at 18 at the rear of the standard 1, the free end of this shoe bar being turned upward as at 19.

The numeral 20 indicates a lever which is connected as at 21 to the shoe bar 17, said lever being pivoted as at 22 to the beam A. This lever is also provided with a locking rod 23 carrying the locking bar 24, adapted to engage in the usual manner with the quadrant rack 25 fastened to the beam A. A handle 26 is connected to the locking rod 23 and may be manipulated in the usual manner to release the locking pawl from the quadrant. When the pawl is so released, the lever 20 may be swung forward or rearward. In swinging it forward the shoe bar may be raised to the space between the two wings 4 so that the plow will move over the ground in the usual manner. When, however, it is desired to elevate the point 2 of the plow so as to pass the water course or channel without cutting into the latter, the lever is swung to lower the shoe bar 17 to the position shown in Fig. 2, so that said bar will press against the ground and the forward end of the plow will consequently be tilted upward as illustrated in said Fig. 2. The plow is provided with the usual handles H.

From the above description, taken in connection with the accompanying drawings, the construction and manner of employing the plow will be readily apparent. It will be seen that when using the plow in the cultivation of the cane, the point 2 passing through the dirt of the furrow will tend to throw the same upward and outward, as in the operation of hilling, and the dirt engaging with the outer sides of the wings 4 and with the flanges 7 will be thrown inward toward the roots of the cane. At the same time as the dirt rises or is pushed toward the rear of the plates it will be caught by the curled or curved ends 6 and thrown on the roots of the cane or to the base of the stalks. It will further be noted that the two wings may be adjusted to suit furrows of different widths, and that the plow may be raised and lowered to prevent cutting through small irrigation channels or courses.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claim.

What I claim is:

In a plow having a beam and a pair of mold boards hinged at their forward ends to swing laterally, means for moving the rear ends of the mold boards to and from each other comprising a lever pivoted intermediate its ends to the beam and having its lower end projecting downwardly between the mold boards and provided with a slot extending longitudinally of the lever, a link having one end engaged in the slot, a pair of vertically spaced and alined ears on the other end of the link, a pivot pin passing through said ears and toggle links each having one end pivoted on the pin and its remaining end pivoted to a respective mold board.

In testimony whereof, I affix my signature, in the presence of two witnesses.

ALFRED C. FRANCO.

Witnesses:
 M. M. FRITEIOR,
 H. GERNOTH.

Copies of this patent may be obtained for five cents each, by addressing the "Commissioner of Patents, Washington, D. C."